United States Patent
Rider et al.

[11] Patent Number: 5,290,071
[45] Date of Patent: Mar. 1, 1994

[54] COAXIAL CONDUIT BULKHEAD MOUNTING ASSEMBLY

[75] Inventors: Brian G. Rider, Northampton; Terry D. Gerber, Tamaqua, both of Pa.

[73] Assignee: Air Products and Chemicals, Inc., Allentown, Pa.

[21] Appl. No.: 32,368

[22] Filed: Mar. 17, 1993

Related U.S. Application Data

[63] Continuation-in-part of Ser. No. 910,947, Jul. 9, 1992, Pat. No. 5,230,536.

[51] Int. Cl.$^5$ ............................ F16L 25/00; F16L 5/00
[52] U.S. Cl. ...................................... 285/39; 285/161; 285/192
[58] Field of Search .................. 285/133.1, 161, 177, 285/158, 192, 39

[56] References Cited

U.S. PATENT DOCUMENTS

| | | | |
|---|---|---|---|
| 637,919 | 11/1899 | Brown . | |
| 1,776,652 | 9/1930 | Clayton | 285/161 |
| 1,809,582 | 6/1931 | Church | 285/161 X |
| 1,885,042 | 10/1932 | Baldwin, Jr. . | |
| 2,568,301 | 9/1951 | Pottberg et al. | 285/30 |
| 2,793,830 | 5/1957 | Nakaji et al. | 285/192 X |
| 2,992,018 | 7/1961 | Rosán | 285/161 X |
| 4,828,296 | 5/1989 | Medrick | 285/158 |
| 5,087,795 | 2/1992 | Guginsky | 285/161 X |
| 5,230,536 | 7/1993 | Rider et al. | 285/161 X |

FOREIGN PATENT DOCUMENTS 81540 of 1918 Switzerland .

Primary Examiner—Randolph A. Reese
Assistant Examiner—Heather Chun
Attorney, Agent, or Firm—Geoffrey L. Chase; James C. Simmons; William F. Marsh

[57] ABSTRACT

The present invention is directed to a bulkhead mounting assembly comprising a bulkhead-securing flange on an integral body having a large diameter externally threaded portion and a small diameter externally threaded portion with the large diameter externally threaded portion engaging a bulkhead-securing nut of sufficient diameter so as to pass over the small diameter externally threaded portion and an outer coaxial conduit-securing nut engaging the small diameter-threaded portion and preferably any cap placed on an inner coaxial conduit such as used to secure ultra high purity conditions within the inner coaxial conduit.

20 Claims, 2 Drawing Sheets ically threaded portion on a single side of
COAXIAL CONDUIT BULKHEAD MOUNTING ASSEMBLY This is a continuation-in-part application of U.S. application Ser. No. 07/910,947 filed Jul. 9, 1992, now U.S. Pat. No. 5,230,536.

FIELD OF THE INVENTION

The present invention is directed to an apparatus for providing mounting and strain relief of coaxial conduits passing into bulkheads. More specifically, the present invention is directed to a coupling which secures to a bulkhead and secures coaxial conduits in the coupling in a manner for avoiding the removal of caps on ultra high purity conduits outside ultra high purity clean environments.

BACKGROUND OF THE PRIOR ART

The prior art has utilized various assemblies for the interface of a conduit passing through a bulkhead or wall. In some instances, the assembly has constituted the juncture between one conduit meeting a second conduit at the location of a bulkhead or wall. In other instances, such assemblies have been merely to secure a conduit as it passes through a bulkhead or wall.

In addition, various structural means are known for securing capped valves for pneumatic tires, wherein a nut securing the valve to the tire casing is capable of passing over a cap that precludes external exposure of the valve assembly.

For instance, in U.S. Pat. No. 1,885,042 a hydraulic coupling is shown, wherein a nut 5 secures the body A to a wall B and a conduit 15 is secured in the coupling A by means of an internally threaded surface and nut C. It is disclosed that nut 5 can pass over nut C.

A valve for a pneumatic tire is disclosed in U.S. Pat. No. 637,919 wherein a tire stem has flange T and an outward threaded portion in housing H engaging a nut C which is larger than cap E threaded over the end of the valve assembly.

U.S. Pat. No. 4,828,296 discloses a bulkhead mounting for fluid fittings having a nut 104 which engages a bulkhead B which is larger than a threaded portion 78a on a discreet assembly distinct from the assembly 28a that nut 104 is securely threaded to. The nut 104 is secured to component 28a and not the component 72a on which the threads 78a are fanned.

U.S. Pat. No. 2,568,301 discloses a well fixture seal having apparatus with multiple diameter threaded regions including 16 and 13. Nut 28 is not described as being larger than any nut engaging thread 16 and nut 28 does not interact with an interval flange for securing the fixture.

Swiss Patent 81540 discloses a pneumatic tire valve having a flange $a^1$, a large threaded portion a and a small threaded portion $a^3$ which engages a cap 1 which entirely secures the end of the valve assembly. Nut f can pass over the cap 1.

The deficiencies and drawbacks of the prior art as recited above are overcome by the unique configuration of the present invention, which provides ease of assembly in a minimum number of components, while providing the flexibility to secure ultra high purity conduits in a coaxial arrangement in a bulkhead in an environment that is not ultra high purity. Such advantages are set forth in greater detail below.

BRIEF SUMMARY OF THE INVENTION

The present invention is a bulkhead mounting assembly for securing at least two coaxial conduits passing into a bulkhead, comprising; an integral body having a large diameter externally threaded portion and a small diameter externally threaded portion on a single side of the body from where the body is affixed to a bulkhead, a bulkhead-securing flange on the opposite side of the body from where the body is affixed to a bulkhead, and an axial passage through the body to accept coaxially aligned conduits wherein the large diameter portion is at least greater in diameter than an outer conduit-securing nut engaging the smaller diameter portion, a bulkhead-securing nut that engages the large diameter threaded portion, an outer conduit-securing nut that engages the small diameter threaded portion, the outer conduit-securing nut having a compression seal engaging flange to compress a seal on an outer conduit of coaxial conduits passing into the bulkhead mounting assembly, a third externally threaded portion on the integral body on the same side of the body as the bulkhead-securing flange, and an inner conduit-securing nut having a compression seal engaging flange to compress a seal on an inner conduit of coaxial conduits passing into the bulkhead mounting assembly.

Preferably, the axial passage has a first large diameter section passing partially through a first part of the body to accept the outer conduit and a second small diameter section passing through a second part of the body to accept the inner conduit.

More preferably, the axial passage has a third intermediate diameter section between the first large diameter section and the second small diameter section communicating with an outlet port in the integral body on the same side of the body as the bulkhead securing flange.

Preferably, the bulkhead-securing flange has at least two flat surfaces on a peripheral edge to assist in securing it in a bulkhead.

Preferably, the peripheral edge of the bulkhead-securing flange has a generally hexagonal shape.

Alternatively, the bulkhead-securing flange has a circular peripheral edge and the large diameter externally threaded portion has at least two flat surfaces on a peripheral edge.

Alternatively, the bulkhead-securing flange has a circular peripheral edge and the small diameter externally threaded portion has at least two flat surfaces on a peripheral edge.

Further alternatively, the bulkhead-securing flange has a circular peripheral edge and the assembly has a third portion with at least two flat surfaces on a peripheral edge located adjacent to the small diameter externally threaded portion and the large diameter externally threaded portion.

Preferably, the bulkhead-securing nut has a greater inside diameter than at least an outside diameter of the outer conduit-securing nut.

Preferably, the small diameter externally threaded portion is adjacent a side of the large diameter externally threaded portion opposite the bulkhead-securing flange.

Preferably, the large diameter externally threaded portion is greater in diameter than a cap secured on the end of a conduit passing through the assembly.

Preferably, the assembly is stainless steel.

Alternatively, the assembly is plastic.

Further alternatively, the assembly is brass.

Preferably, the assembly includes at least one resilient compression ring seal secured between the small diameter externally threaded portion and the outer conduit-securing nut to secure an outer conduit in the axial passage.

Preferably, two interacting seals are secured between the small diameter externally threaded portion and the outer conduit-securing nut.

Preferably, the axial passage adjacent the small diameter externally threaded portion has a radially outward tapered surface to engage the seal.

Preferably, the assembly includes at least one resilient compression ring seal secured between the third threaded portion and the inner conduit-securing nut to secure an inner conduit in the axial passage. More preferably, two interacting seals are secured between the third threaded portion and the inner conduit-securing nut.

Preferably, the axial passage adjacent the third externally threaded portion has a radially outward tapered surface to engage the seal.

DETAILED DESCRIPTION OF THE INVENTION

Figure 1:
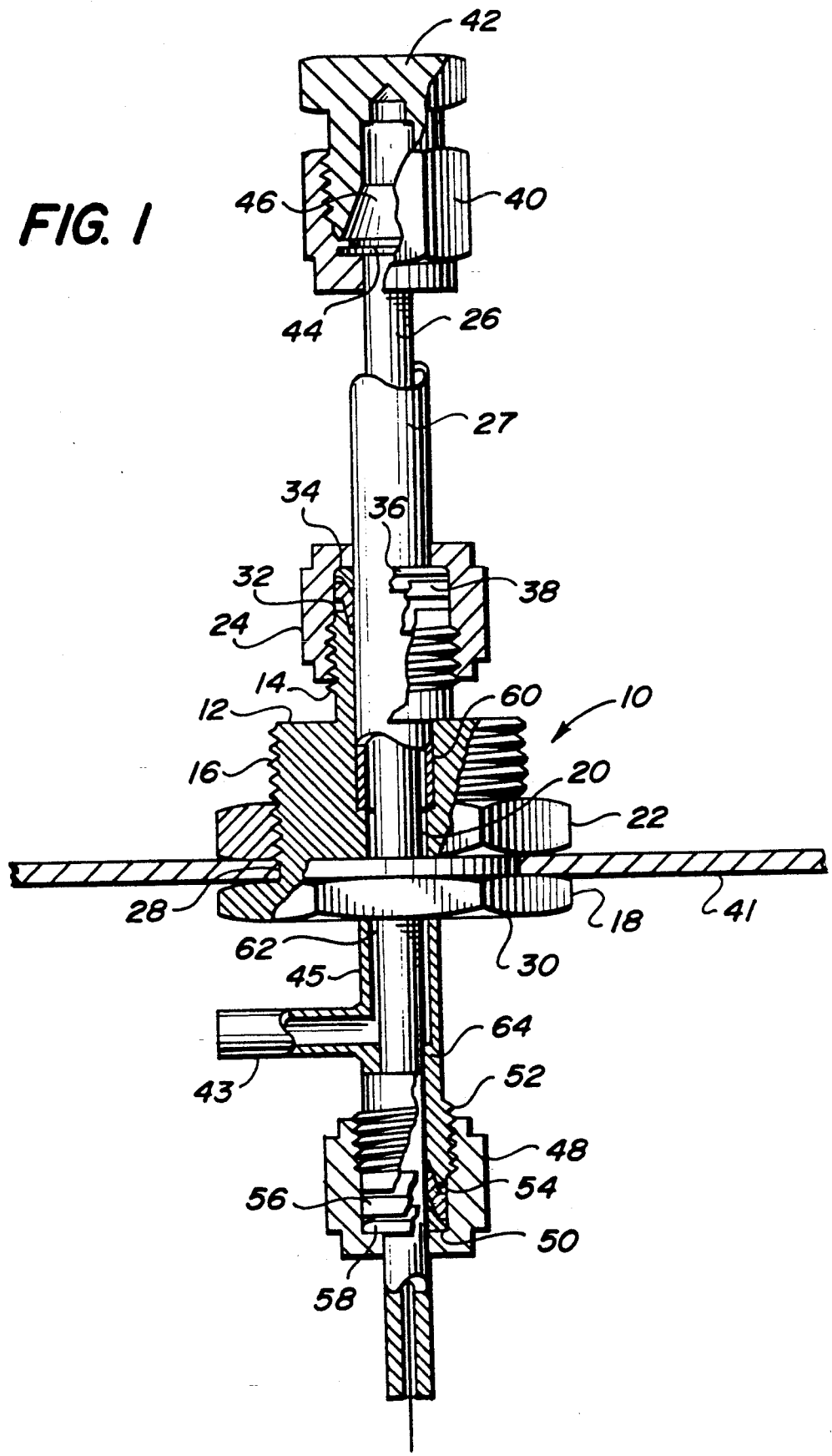
FIG. 1 is a plan view in partial section of a preferred embodiment of the present invention additionally showing a portion of a bulkhead, a conduit and conduit cap.

The present invention is a bulkhead mounting assembly designed to permit coaxial conduits to pass into and/or through a bulkhead wall while providing secure fastening of the conduits against movement and vibration and strain relief from the particular point at which the conduit passes through the bulkhead wall.

The bulkhead mounting assembly is uniquely configured to allow the mounting assembly to be preassembled onto coaxial conduits in a special environment, such as a clean room for an electronic fabrication assembly work station, where the inner coaxial conduit would have a conduit cap preventing contamination of the interior of the inner coaxial conduit. Subsequently, the assemblage of the bulkhead mounting assembly, the coaxial conduits and the conduit cap would be removed from a clean room environment and taken to a normal manufacturing environment having a relatively higher degree of contamination and less cleanliness wherein the assemblage of the coaxial conduits and the bulkhead mounting assembly would further be secured in the bulkhead of an appropriate apparatus, such as a gas cabinet, without the necessity of removing the conduit cap and incurring contamination of the interior of the inner coaxial conduit. This is achieved by the unique diameter of the outer conduit-securing portion of the bulkhead mounting assembly and the bulkhead-securing nut which secures the bulkhead mounting assembly to a bulkhead wall.

By configuring the diameter of the externally threaded portion of the bulkhead mounting assembly which engages the bulkhead-securing nut in a sufficiently large diameter to exceed the outside diameter of the outer conduit-securing nut and any conduit cap, the apparatus lends itself to prior assembly of the bulkhead mounting assembly on coaxial conduits in a special environment, such as a clean room, and the inclusion of a cap on the end of an inner conduit to secure clean room conditions inside the inner conduit prior to the assemblage of the coaxial conduits, cap and bulkhead mounting assembly being positioned and secured in an aperture in a bulkhead, typically comprising an industrial gas cabinet or such other panel or partition as may be desirable to secure coaxial conduits where disassembly is not desired between the bulkhead mounting assembly, any cap on the inner conduit and the inner conduit itself.

The present invention can be fabricated from any reasonable material that is sufficient for machining to the desired shape and with sufficient integrity so as to provide a strong and secure mounting of a conduit in a bulkhead wall. Such materials may include stainless steel, brass or plastics or any combination of these materials or other suitable materials having these physical properties recited above. In addition, the bulkhead mounting assembly of the present invention may be used in conjunction with various resilient compression ring seals such as those comprising nylon or teflon.

The bulkhead mounting assembly comprising an integral body, a bulkhead-securing nut and an outer conduit-securing nut and an inner conduit-securing nut may be fabricated with flat surfaces on the peripheral edge of either the integral body's flange, a portion of the large diameter externally threaded portion, a portion of the small diameter externally threaded portion, or a third unthreaded portion adjacent the small diameter externally threaded portion and the large diameter externally threaded portion for purposes of facilitating the securing of the bulkhead mounting assembly to the bulkhead. In the event that the flat surfaces occur on the flange of the assembly, tightening of the bulkhead-securing nut will require a wrench or other means on both sides of the bulkhead. Alternatively, when flat surfaces exist on the large or small diameter externally threaded portion or the third portion adjacent the threaded portions, securing the bulkhead-securing nut to a bulkhead wall can be accomplished with tools or wrenches engaged on only one side of the bulkhead wall, considerably easing the implementation of the bulkhead mounting assembly.

This feature of the latter alternate embodiments of flat surfaces on a common side of a bulkhead wall to the bulkhead securing nut is particularly desirable and advantageous when the bulkhead mounting assembly is used in an industrial gas cabinet for electronic fabrication industry applications where very high purity conditions are required in various manifolds and gas cabinets delivering gas through such manifolds and conduits and the location of a pass through for conduit coming through the bulkhead wall of a gas cabinet may be distant from any access way or door into the interior of a gas cabinet.

It is also possible to secure coaxial conduits with the present invention. Coaxial conduits are particularly desirable where toxic gases are conveyed in an inner coaxial conduit and a vacuum or flush gas is maintained in the outer coaxial conduit to diminish or remove any leaked toxic gases from the inner coaxial conduit by means of the annular space between the coaxial conduits. Typically such leaks would be conveyed to a gas cabinet or appropriate vent system.

The present invention will now be described in greater detail with reference to the drawings. With reference to FIG. 1, a bulkhead mounting assembly 10 is shown passing through a bulkhead wall 41 and engaging a conduit 26 for passage through the bulkhead wall. The assembly 10 has an integral body 12 comprising a large diameter externally threaded portion 16 and a small diameter externally threaded portion 14 on a single side of the integral body opposite a bulkhead-securing flange 18 which mounts on its opposite side 30 from the bulkhead from where the two threaded portions are located. The portion 16 has a non-threaded circular outer peripheral region 28 which mates with the aperture in the bulkhead wall 41. The integral body 12 has an axial passage 20 comprising a first large diameter section 60, a second small diameter section 64 and a third intermediate section 62 passing through the body 12 longitudinally sufficient for receiving the inner coaxial conduit 26 entirely through the body 12 and the assembly 10. The first large diameter section 60 accepts an outer coaxial conduit 27 which is used to maintain a vacuum outside the inner coaxial conduit or to supply a flush gas to the annular space outside the inner coaxial conduit. The outer coaxial conduit 27 passes into only a portion of the integral body, ending at the third intermediate section 62 which communicates between the annular space between the coaxial conduits and the outlet port 43.

A bulkhead securing nut 22 engages the large diameter externally threaded portion 16 and cooperates with the flange 18 to engage and snugly secure the body 12 to the bulkhead wall 41.

An outer conduit-securing nut 24 is threadably engaged on the small diameter externally threaded portion 14 of the body 12 and in cooperation with a compression seal engaging flange 34 compresses two resilient compression ring seals 36 and 38 into the body 12 and against the outer coaxial conduit 27 by operation of the tapered shape of seal 38 and the frusto-conical internal shape of the body 12 at the axial passage's large diameter section 60 adjacent the end 32 of the small diameter externally threaded portion 14 of the body 12.

The diameters of the portion 16 and the portion 14 of body 12 are sized such that the portion 16 is significantly greater than the portion 14 so as to allow the bulkhead-securing nut 22 to pass over the portion 14 even in the presence of the outer conduit-securing nut 24. This allows the assembly 10 to be secured to the conduit 26, as described below, before securing the conduit and assembly combination or assemblage in the aperture of the bulkhead.

An inner conduit-securing nut 48 is threadably engaged on a third externally threaded portion 52 on a stem 45 of the body 12 and in cooperation with a compression seal engaging flange 50 compresses two resilient compression ring seals 56 and 58 into the body 12 and against the inner coaxial conduit 26 by operation of the tapered shape of seal 56 and the frusto-conical internal shape of the body 12 at the axial passage's small diameter section 64 adjacent the end 54 of the stem 45 of the body 12.

Typically, in producing fluid handling systems, such as gas handling manifolds for ultra high clean conditions as are required in the electronic fabrication industry, conduits for gas manifolding are assembled in an expensive environment, such as exists in a clean room. Such rooms have been produced by the electronics industry with high efficiency filtration, superior sealing, positive air circulation and vestibuled entries and exits at great cost to assure ultra high clean environments for delicate and sensitive electronic fabrication materials and equipment. Because clean rooms, their size and utilization are expensive, it is necessary to minimize the amount of time utilized in a clean room environment and the amount of floor space that comprises a clean room condition. Therefore, it is desirable to minimize the assemblage of conduits for gas handling for electronic applications in such clean room conditions.

The present invention allows a gas handling conduit, for instance, to be fabricated and capped in a clean room environment with the preplacement of the bulkhead mounting assembly on the conduit and removal of the combination of the conduit and the assembly to a non-clean room environment having less expensive construction, maintenance and operation for final fabrication of the conduit into appropriate equipment, such as a gas cabinet, using the bulkhead mounting assembly to secure the conduit in a bulkhead wall of a device or equipment, such as a gas cabinet, without violation, disruption or contamination of the interior of the conduit, which was capped while in the clean room conditions.

The assembly of the present invention with its capability to affix two coaxial conduits in a bulkhead without requiring disassembly of either the outer coaxial conduit or a cap on the high purity inner coaxial conduit affords ease of fabrication assembly outside a clean room environment while providing the greater design safety dictated in some uses, particularly where toxic gases or chemicals are conveyed through the inner coaxial conduit. The outer coaxial conduit affords a sheath to avoid contamination of external environments with such potentially toxic gases or chemicals. Alternately, the outer coaxial conduit can preclude infiltration contamination of the gas or chemical in the inner conduit at a point of joining, or leak point, with any contaminants which may exist in the external environment where the coaxial conduits are placed. This is achieved by either passing a pressurized potentially high purity flush gas through the annular space between the coaxial conduits or maintaining a vacuum on such annular space. The annular space can be in communication with a vent system or scrubber such as would be typically connected to the interior of a gas cabinet.

This capability is also illustrated in FIG. 1 wherein for purposes of illustrating conditions under which the bulkhead mounting assembly of the present invention would be utilized and enjoys its best advantage, a cap assembly is shown comprising externally threaded cap 42 and cooperatively engaging internally threaded hex nut 40 which together sealably secured the end of an otherwise open conduit 26 by means of the cap 42 and resilient compression ring seals 44 and 46. This standard capping assembly requires a certain outside diameter which may or may not be larger than the outside diameter of the conduit-securing nut 24 of the assembly 10 of the present invention. In either event, the assembly 10 would be designed to have a bulkhead-securing nut 22 of sufficient inside diameter to pass over the outer conduit-securing nut 24, as well as the cap assembly, comprising cap 42 and nut 40, so as not to require disassembly when securing the conduits 26 and 27 to the bulkhead wall 41.

The bulkhead-securing nut 22 and the bulkhead-securing flange 18 are illustrated with hexagonal shaped external peripheral edges. However, it can be appreciated that the external surface can have any number of two or more flat surfaces sufficient to engage an appropriate tool for tightening, such as a wrench.

Figure 2:
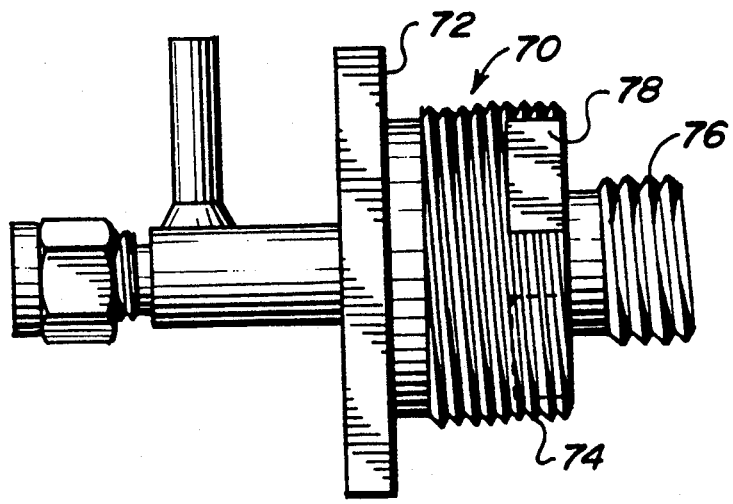
FIG. 2 is an alternate embodiment of the present invention showing only the integral body with a circular flange and flat surface portions on the large diameter portion of the body.
Figure 3:
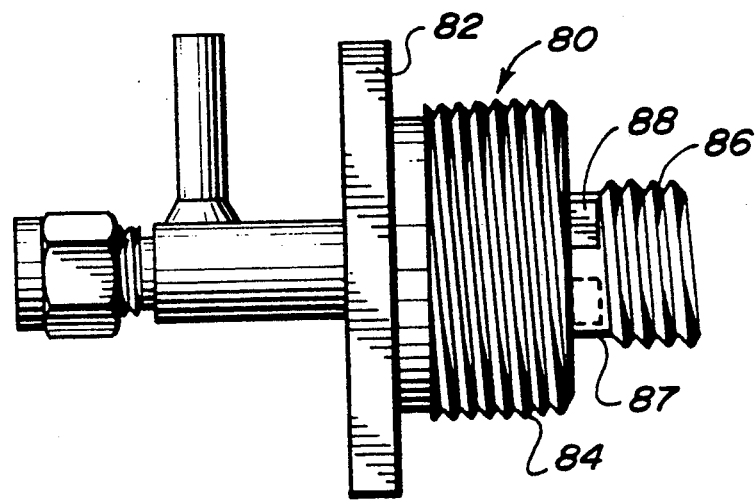
FIG. 3 is an alternate embodiment of the present invention showing only the integral body with a circular flange and flat surfaces on a third portion of the body adjacent the small diameter externally threaded portion and the large diameter externally threaded portion.
Figure 4:
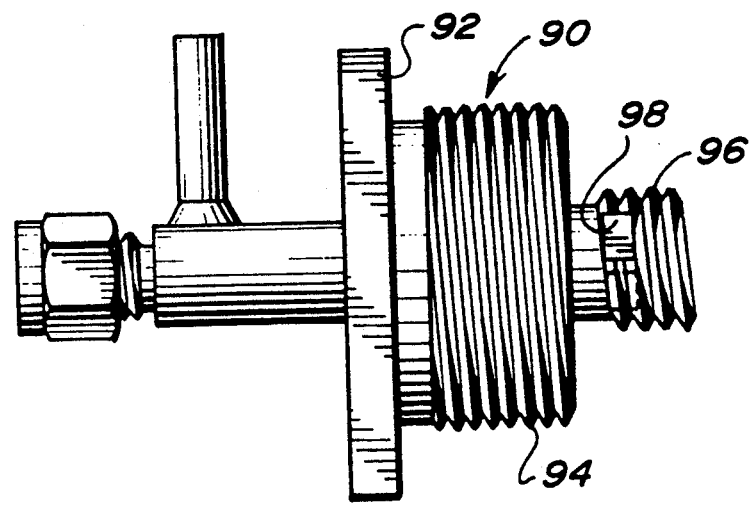
FIG. 4 is an alternate embodiment of the present invention with a circular flange and flat surfaces on the small diameter externally threaded portion.

Such engagement of the bulkhead-securing nut 22 and the flange 18 requires an appropriate tool on either side of the bulkhead wall 41 during the operation of engagement of the mounting assembly 10 into a device such as a gas cabinet. With reference to FIGS. 2, 3 and 4, particular alternate embodiments to the embodiment illustrated in FIG. 1 are set forth which have particular advantage in ease of assembly of the assembly 10 in complicated or confined circumstances, such as exist in gas cabinets as presently used to deliver industrial gases in electronic fabrication industries.

With reference to FIG. 2, the integral body 70 of a comparable bulkhead mounting assembly is illustrated with a circular shaped peripheral edge of the bulkhead-securing flange 72 with appropriate large diameter externally threaded portion 74 and small diameter externally threaded portion 76. The large diameter externally threaded portion 74 includes two opposed flat surfaces 78 on the external surface of portion 74 which makes the threads discontinuous but provides for engagement of a tool, such as a wrench, for tightening of a bulkhead-securing nut, not illustrated. Although two opposed flat surfaces are illustrated, it is understood that additional surfaces may be used or desirable, but the utilization of two opposed flat surfaces provides for minimal disruption of the thread surface for engagement of the bulkhead-securing nut. This allows for easy, one side installation of a bulkhead mounting assembly of the present invention with tools used on the bulkhead-securing nut and the flat surfaces 78 of the integral body 70 by, for instance, a single operator or fabricator on one side of the bulkhead wall.

With reference to FIG. 3, a comparable integral body 80 is illustrated with a circular outer peripheral edge on flange 82 and a large diameter externally threaded portion 84 and a small diameter externally threaded portion 86. The integral body 80 additionally has a third portion 87 which is unthreaded, yet has two opposed flat surfaces 88 which provide the same degree of flexibility in assembly and engagement as the flat surfaces of the embodiment of FIG. 2, but without the disruption of the threaded surfaces of the integral body 80.

Additionally, with reference to FIG. 4, an integral body 90 is illustrated with circular peripheral edge flange 92 and large diameter externally threaded portion 94 wherein the small diameter externally threaded portion 96 includes two opposed flat surfaces 98 which provide the same function as the flat surfaces in FIG. 2 and FIG. 3 above.

Although each of these embodiments has been illustrated with the flat surfaces having two opposed surface configurations for tool or wrench engagement, it is contemplated that additional flat surfaces, such as traditionally provided with hexagonal flat surface nuts and couplings, can be contemplated so long as when the flats exist on a threaded portion, sufficient thread portion remains for engagement of the bulkhead-securing nut or the conduit-securing nut so as to retain the functionality of the overall assembly.

Although the present invention has been set forth in detail with regard to several preferred embodiments, the full scope of the invention should be ascertained from the claims which follow.

We claim:

1. A bulkhead mounting assembly for securing at least two coaxial conduits passing into a bulkhead, comprising;
    (a) an integral body having a large diameter externally threaded portion and a small diameter externally threaded portion on a single side of said body from where said body is affixed to a bulkhead, a bulkhead-securing flange on the opposite side of said body from where said body is affixed to a bulkhead, and an axial passage through said body to accept coaxially aligned conduits, wherein said large diameter portion is at least greater in diameter than an outer conduit-securing nut engaging said smaller diameter portion;
    (b) a bulkhead-securing nut that engages said large diameter threaded portion, and
    (c) an outer conduit-securing nut that engages the small diameter threaded portion, said outer conduit-securing nut having a compression seal engaging flange to compress a seal on an outer conduit of coaxial conduits passing into said bulkhead mounting assembly;
    (d) a third externally threaded portion on said integral body on the same side of said body as said bulkhead securing flange;
    (e) an inner conduit-securing nut that engages the third threaded portion, said inner conduit-securing nut having a compression seal engaging flange to compress a seal on an inner conduit of coaxial conduits passing into said bulkhead mounting assembly.

2. The apparatus of claim 1 wherein said axial passage has a first large diameter section passing partially through a first part of said body to accept said outer conduit and a second small diameter section passing through a second part of said body to accept said inner conduit.

3. The apparatus of claim 2 wherein said axial passage has a third intermediate diameter section between said first large diameter section and said second small diameter section, communicating with an outlet port in said integral body on the same side of said body as said bulkhead securing flange.

4. The apparatus of claim 1 wherein said bulkhead-securing flange has at least two flat surfaces on a peripheral edge to assist in securing it in a bulkhead.

5. The apparatus of claim 4 wherein said peripheral edge has a generally hexagonal shape.

6. The apparatus of claim 1 wherein said bulkhead-securing flange has a circular peripheral edge and said large diameter externally threaded portion has at least two flat surfaces on a peripheral edge.

7. The apparatus of claim 1 wherein said bulkhead-securing flange has a circular peripheral edge and said small diameter externally threaded portion has at least two flat surfaces on a peripheral edge.

8. The apparatus of claim 1 wherein said bulkhead-securing flange has a circular peripheral edge and said assembly has a third portion, with at least two flat surfaces on a peripheral edge, located adjacent said small diameter externally threaded portion and said large diameter externally threaded portion.

9. The apparatus of claim 1 wherein said bulkhead-securing nut has a greater inside diameter than at least an outside diameter of said outer conduit-securing nut.

10. The apparatus of claim 1 wherein said small diameter externally threaded portion is adjacent a side of said large diameter externally threaded portion opposite said bulkhead securing flange.

11. The apparatus of claim 1 wherein said large diameter externally threaded portion is greater in diameter than a cap secured on an end of a conduit passing through said assembly.

12. The apparatus of claim 1 wherein said assembly is stainless steel.

13. The apparatus of claim 1 wherein said assembly is plastic.

14. The apparatus of claim 1 wherein said assembly is brass.

15. The apparatus of claim 1 wherein said assembly includes at least one resilient compression ring seal secured between said small diameter externally threaded portion and said outer conduit-securing nut to secure an outer conduit in said axial passage.

16. The apparatus of claim 15 wherein two interacting seals are secured between said small diameter externally threaded portion and said outer conduit-securing nut.

17. The apparatus of claim 1 wherein the axial passage adjacent said small diameter externally threaded portion has a radially outward tapered surface to engage said seal.

18. The apparatus of claim 1 wherein said assembly includes at least one resilient compression ring seal secured between said third threaded portion and said inner conduit-securing nut to secure an inner conduit in said axial passage.

19. The apparatus of claim 18 wherein two interacting seals are secured between said third threaded portion and said inner conduit securing nut.

20. The apparatus of claim 1 wherein the axial passage adjacent said third externally threaded portion has a radially outward tapered surface to engage said seal.

* * * * *